Sept. 9, 1924.

H. D. SCHUETT

GRAIN DRILL

Filed Feb. 20, 1922

WITNESS:
L. B. James

H. D. Schuett
INVENTOR
BY Victor J. Evans
ATTORNEY

Sept. 9, 1924.

H. D. SCHUETT

GRAIN DRILL

Filed Feb. 20, 1922

H. D. Schuett
INVENTOR

BY Victor J. Evans
ATTORNEY

L. B. James,
WITNESS:

Patented Sept. 9, 1924.

1,507,688

UNITED STATES PATENT OFFICE.

HERMAN D. SCHUETT, OF HULL, IOWA.

GRAIN DRILL.

Application filed February 20, 1922. Serial No. 538,061.

*To all whom it may concern:*

Be it known that I, HERMAN D. SCHUETT, a citizen of the United States, residing at Hull, in the county of Sioux and State of Iowa, have invented new and useful Improvements in Grain Drills, of which the following is a specification.

In grain drills, dirt collected on the wheels of the implement very frequently drops therefrom into the drill spouts adjacent the said wheels, at the open space between the said drills and the feed wheel on the feed shaft, with the result that the drills become clogged and the seed is not properly or uniformly placed in the ground. To obviate this, some farmers have resorted to tying cloths around these portions of the drills. This is rather a crude and not altogether effective method and such coverings must be removed when it is desired to lubricate the feed shaft or to remove particles of straws, weeds or stems that accumulate with the grain in the grain hopper. It is the object of the present invention to produce a protective cover for the outer or end drill spouts on a wheeled grain drill which will effectively shed material therefrom but which may be readily opened for the inspection of the interior of the spout, the lubrication of the drill shaft, or the removal of foreign matter from the drill spout.

A further object is to produce a protective device of this character which shall be of an extremely simple construction, cheaply manufactured, readily attached, and thoroughly efficient for the purpose for which it is devised.

The foregoing, and other objects which will appear as the nature of the invention is better understood, may be accomplished by a construction, combination and operative association of parts, such as is disclosed by the drawings which accompany and which form part of this specification.

In the drawings:—

Figure 1:
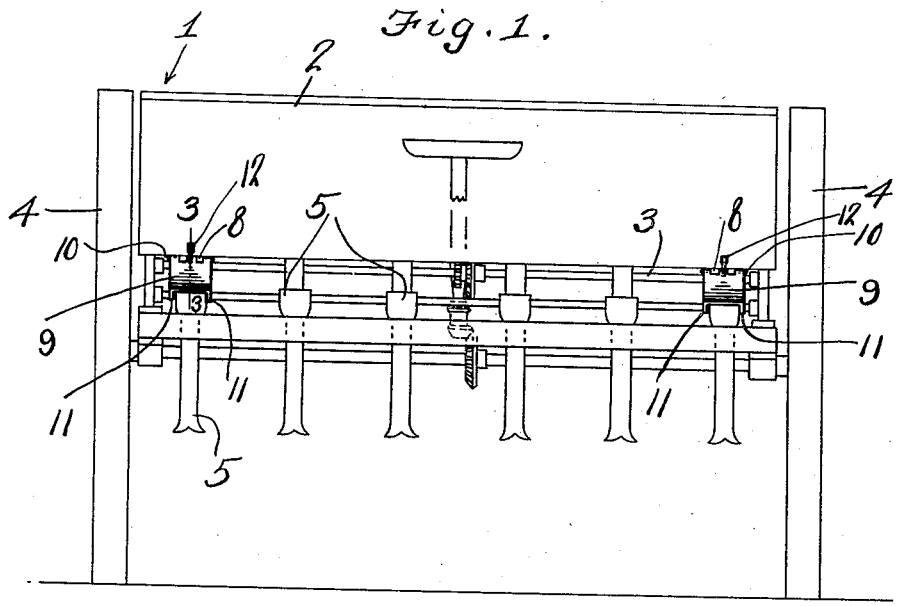
Figure 1 is a rear elevation of a grain drill illustrating the application of the improvement thereon.
Figure 2:
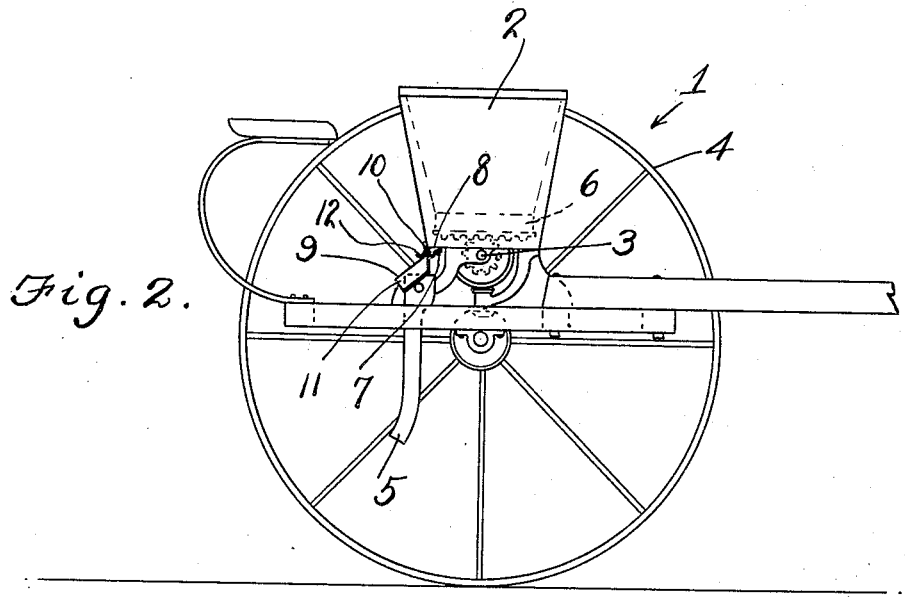
Figure 2 is a side elevation thereof.
Figure 3:
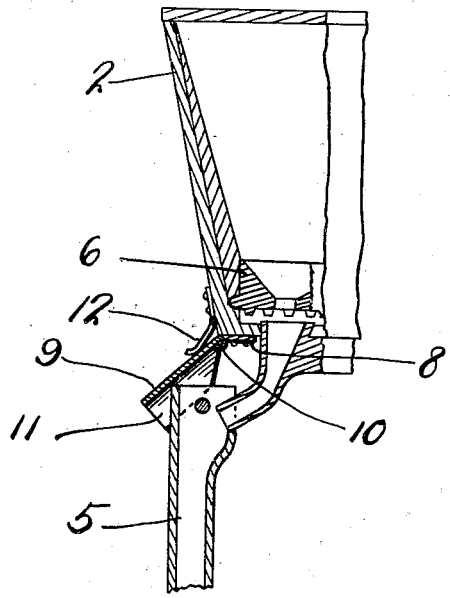
Figure 3 is a sectional view on the line 3—3 of Figure 1.
Figure 5:
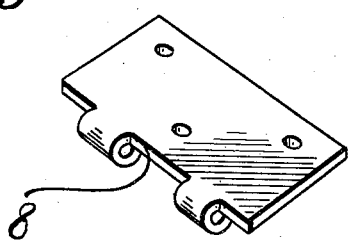
Figure 5 is a perspective view of the butt.
Figure 4:
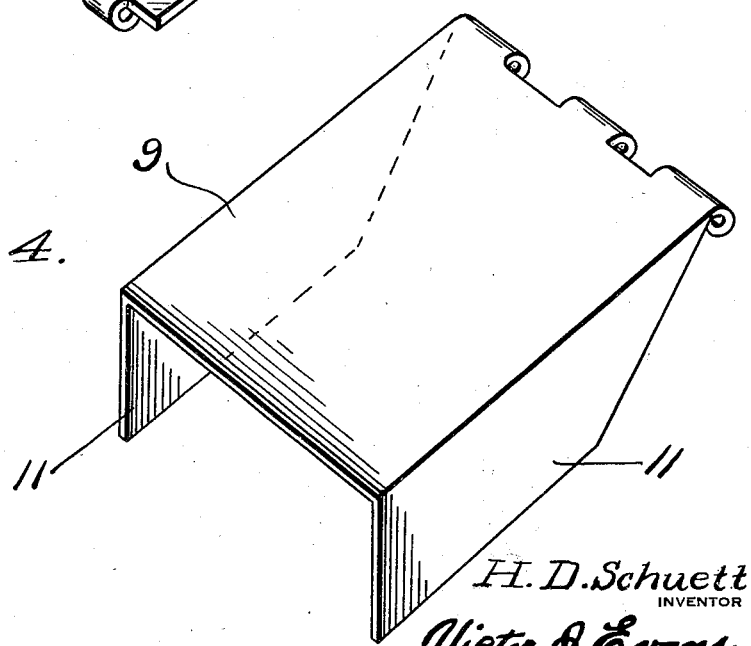
Figure 4 is a perspective view of the improvement.

Referring now to the drawings in detail, the numeral 1 designates, broadly, an ordinary wheeled grain drill. The hopper 2 of the drill has passed through its bottom portion the usual drill shaft 3, the same being revolved by mechanism connected to one of the ground wheels 4. The shaft is housed in the usual manner, the said housing being provided with spaced outlets below each of which is a drill spout 5. On the drill shaft, in a line with each of the drill spouts there is a feed wheel 6, the feed wheel delivering the grain into the drill prior to its deposit in the ground.

There is an open space between the feed wheel housing and the top of each of the drill spouts. The end drill spouts are positioned close to the ground wheels and dirt collecting upon the said wheels will drop therefrom into the referred to spaces, with the result that the spouts become clogged or the grain is not evenly distributed through all of the spouts. This is especially true in rainy weather or when the ground is in a moist condition immediately after a rainy spell.

To obviate the deficiency thus occasioned I screw, as at 7, to the rear of the grain hopper or to the feed shaft housing, directly above each of the end or outer drill spouts, a butt 8, the knuckles of the said butt receiving therebetween similar knuckles formed on the inner ends of the protector covers 9. A pivot 10 passes through the aligning knuckles. Each of the protectors has its sides flanged, as at 11, the said flanges covering the sides of the drill spouts, and the cover, when in operative position also closing the space or opening between the drill spouts and the feed shaft housing. If desired, there may be a spring 12 to influence each of the covers to closed position.

It is thought that the foregoing description, when taken in connection with the drawings will fully set forth the simplicity of the device, the ease in which the same can be attached, and the advantages of the improvement to those skilled in the art to which such inventions relate, and that further detailed description will not be required.

Having described the invention, I claim:—

In a grain drill, a feed wheel housing having an outlet, a delivery tube pivotally supported beneath and to the rear of said outlet, a cover for said tube hinged to said housing above said outlet, said cover inclining downwardly and rearwardly from said housing, and having flanges overlying and contacting with the side of the delivery tube, and a leaf spring secured to the rear of said housing and having a portion bearing on said cover.

In testimony whereof I affix my signature.

HERMAN D. SCHUETT.